Aug. 6, 1946.   R. MISTELI   2,405,320
NOTICE IMPELLING DEVICE
Filed March 31, 1944   2 Sheets-Sheet 1
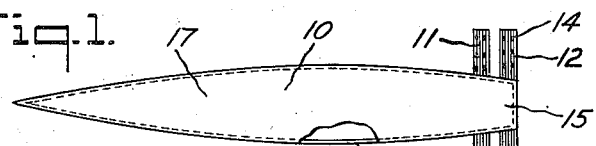
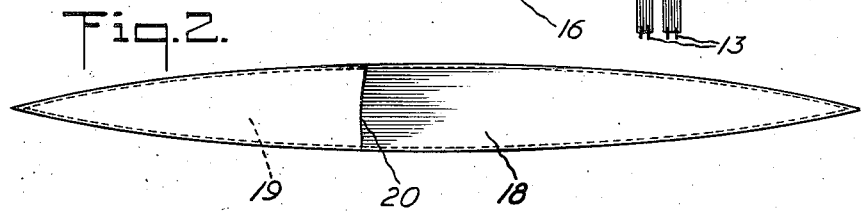
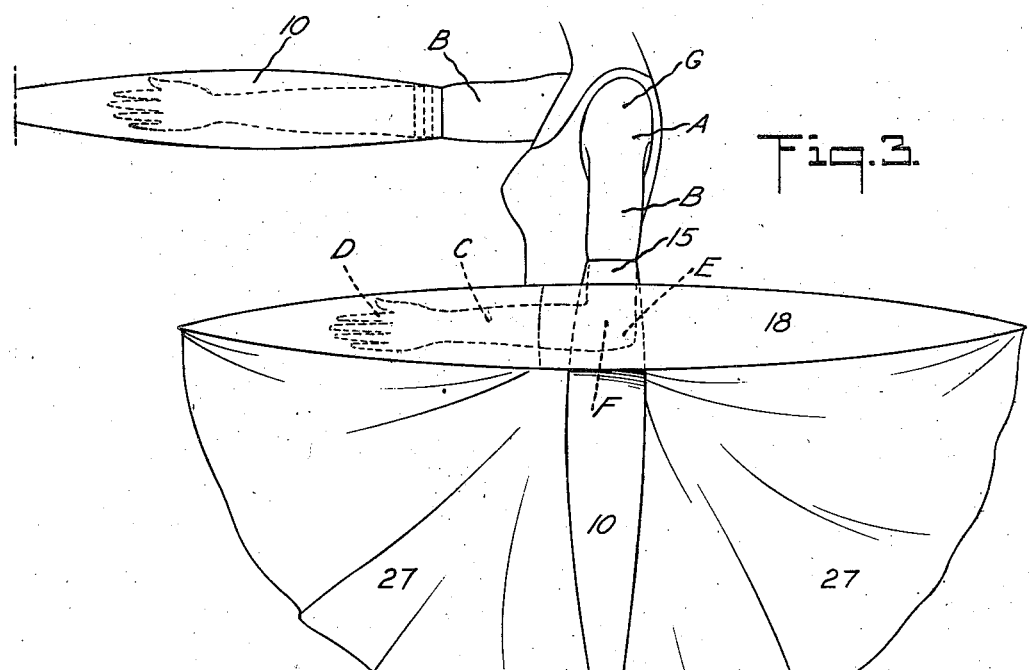
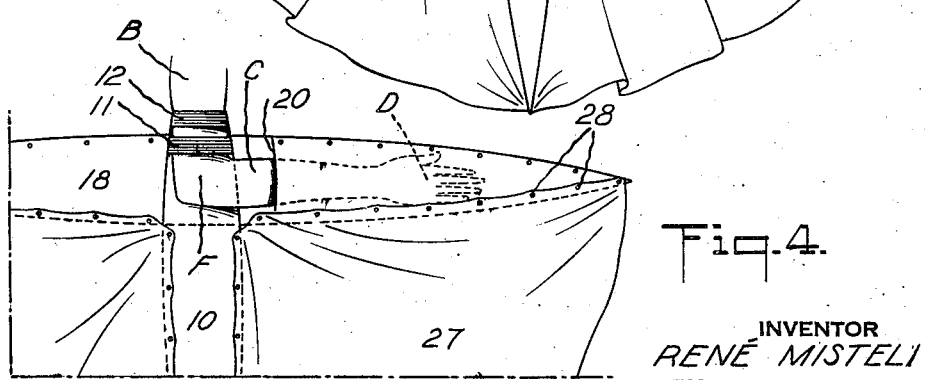
INVENTOR
RENÉ MISTELI
BY
Warren S. Orton
ATTORNEY Aug. 6, 1946.   R. MISTELI   2,405,320
NOTICE IMPELLING DEVICE
Filed March 31, 1944   2 Sheets-Sheet 2
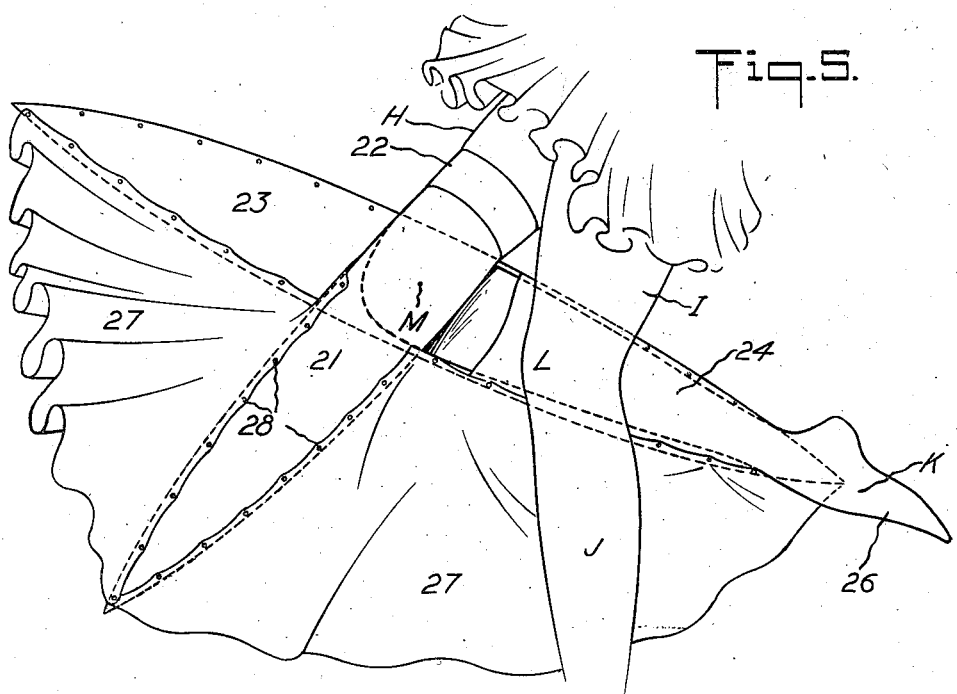
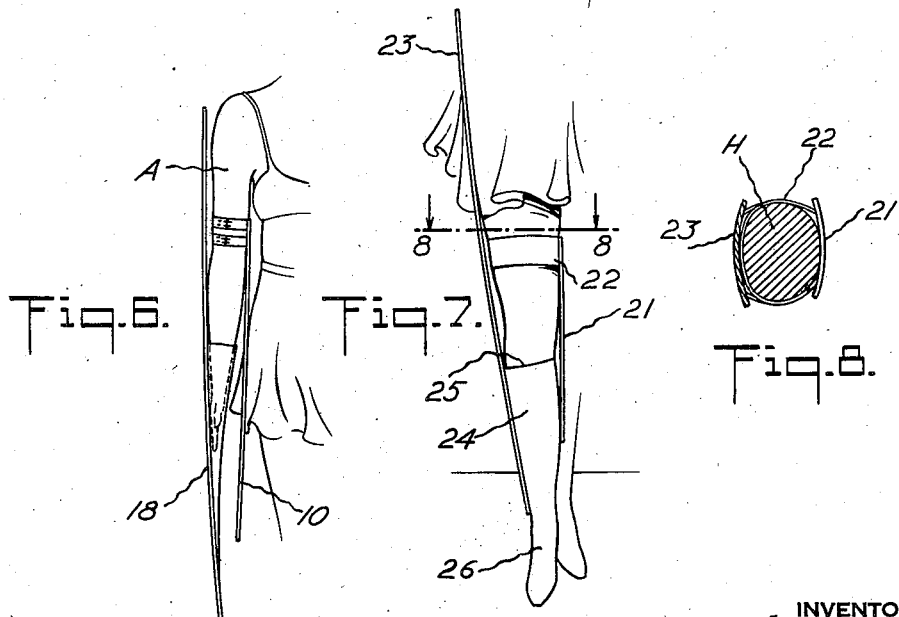
INVENTOR
RENÉ MISTELI
BY
Warren S. Orton
ATTORNEY Patented Aug. 6, 1946

2,405,320

UNITED STATES PATENT OFFICE 2,405,320

NOTICE IMPELLING DEVICE

René Misteli, New York, N. Y.

Application March 31, 1944, Serial No. 528,861

12 Claims. (Cl. 272—21)

The invention relates in general to a notice impelling device, and the invention specifically relates to a device whch in a more or less fancy form may be used as part of a dancer's costume to give various esthetic displays incidental to the bending of the arms and the legs; and in a more utilitarian form may be used on one or both arms of an operator for use as a semaphore or other signal device; or, when used on either legs or arms, or both, as an animated notice attracting advertising device.

The primary object of the invention is to provide a simple form of notice impelling device of the type above outlined by means of which various visual effects in configurations and color relations, or both, may be produced by the act of flexing or bending the arms or the legs of the operator.

Broadly, the invention features two visually cooperative display elements for use with either one or both arms or legs, one secured to the upper arm or leg to form at all times a continuation thereof projecting across the elbow or knee joint as the case may be, and the other secured to the lower arm or leg to form a continuation thereof projecting across the associated elbow or knee and arranged to move to and from an overlapping, into angled relation incidental to the flexing of the operator's arms or legs.

The invention also contemplates the use, if desired, of different colors on the adjacent, inner, and on the two outer surfaces of the two display elements to give a change in color display as the elements are shifted from one relative position to another and as viewed from whichever side is presented to the observer.

Various other objects and advantages of the invention will be in part obvious from an inspection of the accompanying drawings and in part will be more fully set forth in the following particular description of one form of display device embodying the invention, and the invention also consists in certain new and novel features of construction and combination of parts hereinafter set forth and claimed.

In the accompanying drawings,

Fig. 1 is a plane view of one of the two cooperative elements forming a device constituting a preferred embodiment of the invention, with parts broken away, and disclosing an inside panel for attachment to an upper arm of the operator;

Fig. 2 is a similar view of the coacting element and disclosing an outside panel for attachment to the lower arm of the operator viewing the same from the inner or pocket containing side;

Fig. 3 is a side view of a user with the panel of Fig. 1 shown on the user's right arm distended forwardly in dotted outline, and with the reverse or outer side of Fig. 2 shown horizontally on the bent left forearm and the outer side of Fig. 1 depending downwardly and also showing a skirt forming panel;

Fig. 4 is a detail showing of the reverse side of the left forearm opposite that shown in Fig. 3;

Fig. 5 is a slightly modified form of the invention carried by one leg of the user bent at the knee and showing a flexible skirt forming panel;

Fig. 6 is a view in front elevation of the panels of Figs. 1 and 2 shown without the flexible panel;

Fig. 7 is a view in front elevation of the panels of Fig. 5 also shown without the flexible panel; and Fig. 8 is a transverse sectional view on the line 8—8 of Fig. 7 looking downwardly.

In the drawings and referring first to the arm form of the device, there is disclosed a person's arm A including an upper arm B, a lower arm C with hand D and elbow E; it being understood that the upper and lower arm can be flexed about axis F at the elbow. It is also understood, of course, that the arm as a whole can be bent about axis G at the shoulder of the operator.

Referring to the device illustrated in Figs. 1–4 and Fig. 6 and which is understood to constitute one simple physical form of the invention there is disclosed an inside rigid panel 10 provided adjacent one end with a pair of straps 11 and 12, designed to encircle the upper arm B at points sufficiently spaced apart so that the panel 10 provided adjacent one end with a pair of straps 11 and 12, designed to encircle the upper arm B at points sufficiently spaced apart so that the panel 10 will extend in elongation of the upper arm and across the elbow E, in all positions of the upper arm. The straps are provided with hooks 13 for engaging selectively in variably spaced eyelets 14 to accommodate the panel to fit arms of different cross sections and size.

The panel is flat for the major portion of its area, except that the end 15 from which the straps extend is sufficiently flexible to conform at least approximately to the curvature of the portion of the arm which it encircles at least partially. Due to the various forms in which this panel may be constructed, no attempt is made herein to emphasize any particular form or construction, it being noted that in the instant case the larger panel 18 is elliptical and the small panel 10 is semi-elliptical that is, it has one end cut off. Structurally the panel is made of a supporting wire frame 16 covered with a light fabric, paper, or other fibrous material or feathers, indicated generically by the reference character 17, and is not intended to transmit any weight strains therethrough. The panel 10 when in place as indicated in Figs. 3, 4 and 6 is located to extend on the inside of the arm, that is, the side adjacent the body and extends flatwise for the major part of its extent in a plane perpendicular to the axis of elbow turn at F.

Referring to the outside rigid panel 18 illustrated in Figs. 2, 3, 4 and 6, it will be understood that it is intended to have a length to extend from substantially the shoulder of the operator to a point well below the knees. The panel 18 is provided on that side which is the inner side, that is the side nearest the body, with a hand receiving pocket 19. The pocket is provided with an opening 20 located approximately midlength of the panel and so disposed that when the hand D is thrust into the pocket as shown in Fig. 4, the intrusion of the hand will be sufficiently extensive so that as the forearm C is moved, the panel 18 will move with it and in effect will at all times be fixed thereto and move therewith. In this construction, it will be obvious that as the forearm is moved into an angled relation with the upper arm, the long panel 18 will turn about the axis F as indicated in Fig. 3 and form a cross or X-effect at the elbow.

It is the intent in the illustrated disclosures to have the two panels appear as a single device when distended in overlapped relation. For this purpose the shorter panel 10 conforms in dimensions and configuration with the end portion of the longer panel 18 overlapped thereby.

It is also suggested that the opposite sides of the two panels be either of the same color or that they be variously colored to give any desired color combination with visible or black light. In the illustrated embodiment of the invention, it is suggested that the outer side of panel 18 be of one color and the inside be of a different color, and that the outside of panel 10 be of a color contrasting with the outside of panel 18 and that the inner side of panel 10 be of a color contrasting with the inside of panel 18.

In operation, it will be understood that if the device is used by a dancer, or by a member of a chorus, or by other artists in a theatrical display, different effects can be produced incidental to the movements of the artist's legs and arms. In the case where the device is used as a signal device, preset arm movements can be used to indicate letters or other signal characters as semaphore and flag signals are at present used.

Referring to the leg form of the invention shown in Figs. 5 and 7, there is disclosed a leg H including an upper leg I, a lower leg J, foot K, and knee L, bendable about the knee axis M. This form resembles the arm form shown in the preceding figure and includes two elements, an upper, short element 21 secured to the upper leg I by means of a fastening band 22 resembling a broad band garter. A longer element 23 is provided on its inner side with a pocket 24 having an opening 25 into which the lower leg J is intruded. The extreme lower end forms a sock 26 for receiving the foot K. As illustrated, the longer panel has a length to reach from the user's foot to above her hips.

Instead of using the panels as separate items, it is suggested that a different and more unitary or one-piece effect may be produced by securing a sheet of flexible material such as the substantially triangle sheet 27 with its hypothenuse or other edge portion secured to the long panel from end to end, and with another of its edge portions, for instance, its opposite apex secured to the free end of the short panel as shown in Figs. 3 and 5, with the several parts in distended position.

With this form of the device, the flexible panel part 27 will drop into folds or pleats when the stiff panels or equivalent long supports fall into their vertical positions. Here also the loose panel or skirt forming drape 27 may be of the same or of a contrasting color with the balance of the device. It is also suggested that the flexible panel 27 be removable from the rigid panels 10 and 18, or 21 and 23, and for this purpose the flexible panels are secured in place by snap fasteners 28.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. A notice impelling device for use on a person's arm comprising two elongated and substantially stiff elements, one materially longer than the other, the shorter element provided adjacent one end with fastening means for securing the same to the upper arm to extend at all times across the operator's elbow in prolongation of said upper arm and the longer element fashioned to have a length greater than the length of the operator's forearm, provided with a hand-receiving pocket having its opening adjacent the midlength of said longer element and on one side therefore, and adapted when the operator's hand is in said pocket to move with the associated forearm and having a length sufficient to extend outwardly beyond the hand in prolongation with the operator's forearm and in the opposite direction across and beyond the associated elbow.

2. A notice impelling device for use on a limb of a person, comprising two elongated and substantially stiff panels, each fashioned to extend across the axis of turn of the elbow or knee depending upon whether the device is used on the arm or leg of the operator, one of the panels provided with means for securing the same to the upper element of the limb and for maintaining the same at all times in alignment with said upper limb element, and having a length sufficient to extend from said securing means across and beyond the associated axis, and the other panel provided with means for securing the same to the lower element of the limb and having a length to extend for a material distance in opposite directions beyond the said associated axis.

3. A notice impelling device for use on the limb of a person, comprising two elongated panels physically independent of each other, each substantially stiff and flat and having a width substantially equal to that of the person's limbs to which it is to be applied, the panels fashioned when in use to extend across the axis of turn of the elbow or knee depending upon whether the device is used on the arm or leg of the operator, and fashioned at all times to extend with their flat dimensions parallel to each other and in parallel planes perpendicular to said axis, one of the panels provided with means for encircling the upper element of the limb for a material distance along the same to secure said panel at all times in position fixed relative to and in prolongation of said upper limb element, and the other panel provided with means adapted to be engaged by the lower element of the limb fixed relative to and movable therewith as the lower element is flexed to and from its position in elongation with the upper element.

4. A device of the class described, comprising two substantially flat panels, one longer than the other and the longer being of substantially elliptical form in plan, the shorter panel corresponding in dimension and configuration to one end portion of the longer panel whereby one tends to conceal the other when in superposed relation, the shorter panel provided adjacent one end with fastening means for securing the same to the upper arm or upper leg of the user and in prolongation of the same across the axis of the associated joint, and the longer panel provided on one side with means adapted to be engaged by the lower arm or lower leg of the user for moving the longer panel relative to the shorter panel in a plane parallel to the plane containing the flat dimension of the shorter panel.

5. A notice impelling device for use on a person's limb at the joint, comprising two cooperative parts relatively movable when inoperative position about the axis of the limb joint and when one element of the limb is flexed relative to the other, one of said parts provided with means for attaching it to one element of the limb in position projecting lengthwise therebeyond across said joint and the other part provided with means for attaching it to the other element of the limb in position projecting lengthwise therebeyond across the joint whereby the parts are disposed parallel to each other when the elements of the limb form a straight angle and whereby the parts assume an X-form at the joint when the elements of the limb assume other than a straight angle.

6. A device for use on the leg of an operator including two panels, one longer than the other and adapted when in position to overlap each other at the knee of the user and on opposite sides thereof, the shorter panel provided with a garter form of fastening means for securing the same to the upper leg in position projecting beyond the knee, the longer panel provided with means for securing it to the lower leg of the user and forming a sock at its lower end for receiving the foot of the user and having its upper end free to move in space.

7. A device of the class described for use on a person's limb at the joint, comprising two substantially rigid elongated supports, one longer than the other, means for securing the shorter support to the upper element of the limb and extending therefrom beyond the joint, means for securing the longer support to the lower element of the limb and extending beyond the joint, and a panel of flexible material extending between and having an edge portion thereof secured to both of the supports.

8. In a device of the class described, the combination of two flat display elements operable when in position on an operator's arm to move flatwise in parallel planes and perpendicular to the axis of turn of the associated elbow, one element provided with means for securing it to the upper arm of the operator and the other element provided with means for securing it to the lower arm of the operator and said elements disposed in overlapping relation when the arm is straight and in angled relations with the arm bent, and said elements when in said angled relation and viewed from one side presenting contrasting colors.

9. An article of manufacture comprising two separate elongated elements fashioned to be disposed one on the inside and the other on the outside of a limb joint of the wearer, one of the elements provided with means for securing it to the upper portion of the limb above the joint to extend at all times lengthwise in alignment with said upper portion and the other element provided with means for securing it to the lower portion of the limb below the joint to extend at all times lengthwise in alignment with said lower portion.

10. A notice impelling article of elongated form having a rigidity merely sufficient to maintain its form but not intended to transmit any weight strains therethrough and provided with fastening means for engaging a limb of the wearer adjacent a limb joint to hold the article in alignment with that portion of the limb to which the article is fastened, and said article having a length materially longer than the length of the part of the limb to which it is attached and having a length in one direction beyond said fastening means sufficient to extend from the portion to which it is attached across the associated joint and the portion so extending across the joint projecting a material distance there beyond and free to move in space as it may be controlled by the limb part to which it is fastened.

11. A dancer's costume constituting an elongated notice impelling device provided with a portion fashioned to face and to extend across the limb joint of a wearer and provided to one side of said portion with a limb encircling fastening means for securing the device to a limb of the wearer and spaced relative to the joint and said device having end portions forming extensions projecting in opposite directions from said first named portion with both end portions free to move with the movement of the limb portion encircled by the fastening means.

12. A device of the class described comprising two elements for use on a limb of a wearer, one of the elements provided with fastening means for encircling the upper portion of the limb above its joint on one side thereof and the other element provided with fastening means for encircling the lower portion of the limb below its joint on the opposite side thereof.

RENÉ MISTELI.